May 20, 1958

A. C. BALFOUR, JR 2,835,147

WORK FEEDING ATTACHMENT AND STAND FOR
PORTABLE ELECTRIC POWER DRILLS

Filed June 29, 1954

INVENTOR
ANDREW C. BALFOUR, JR.

BY

ATTORNEY

May 20, 1958
A. C. BALFOUR, JR
2,835,147
WORK FEEDING ATTACHMENT AND STAND FOR
PORTABLE ELECTRIC POWER DRILLS
Filed June 29, 1954
3 Sheets-Sheet 2
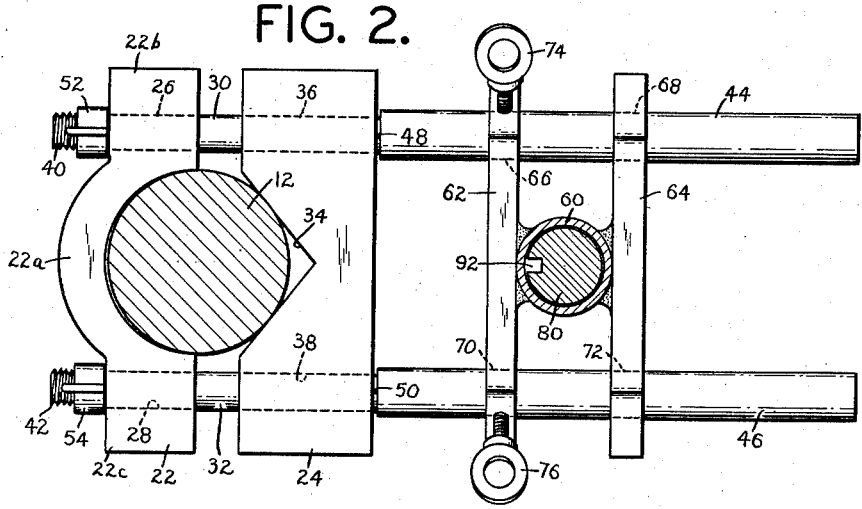
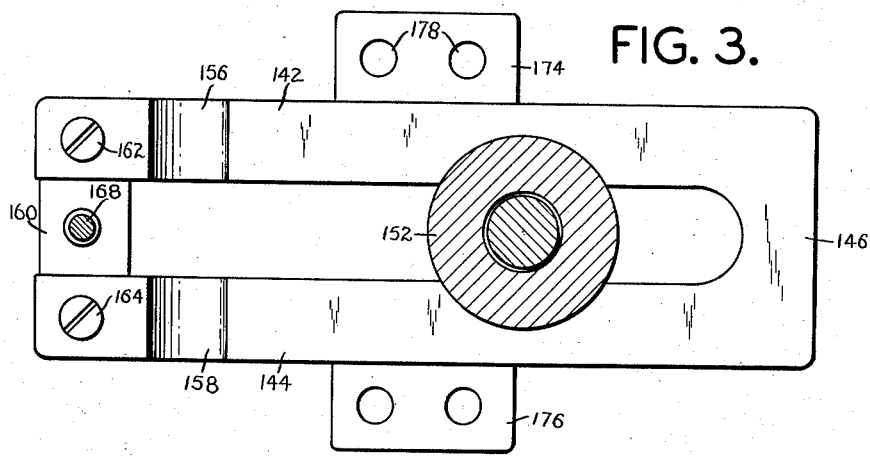
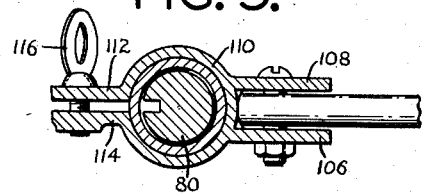
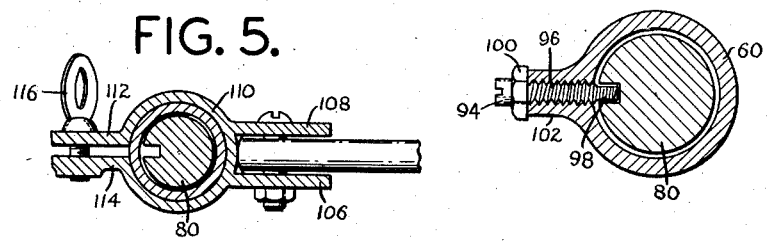
INVENTOR
ANDREW C. BALFOUR, JR.
BY
ATTORNEY

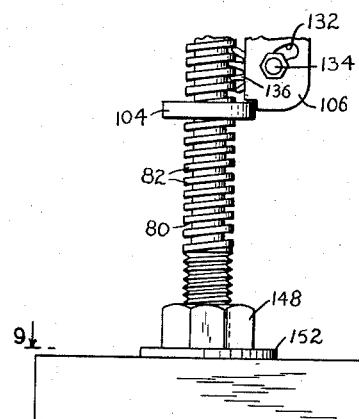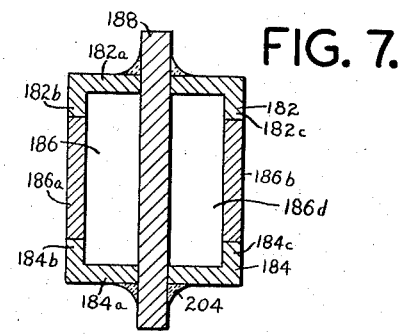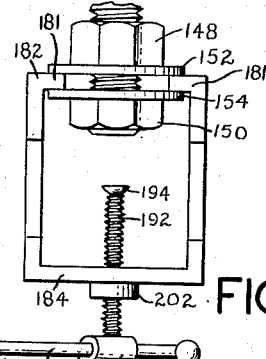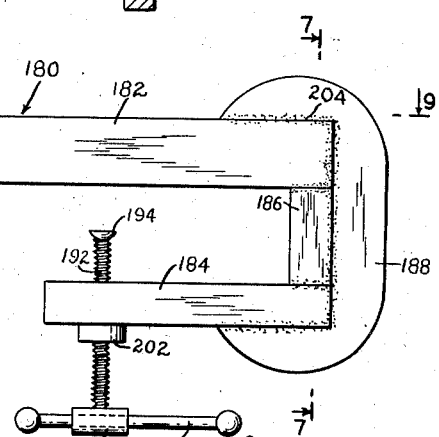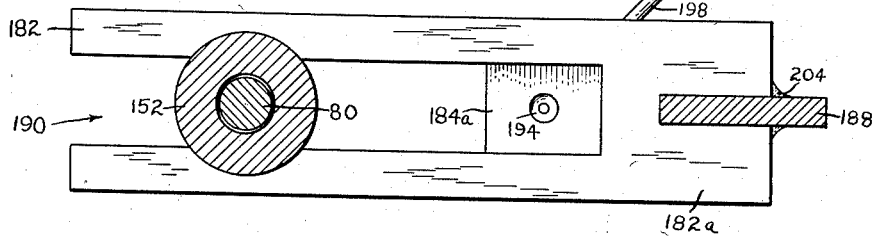

United States Patent Office 2,835,147
Patented May 20, 1958

2,835,147

WORK FEEDING ATTACHMENT AND STAND FOR PORTABLE ELECTRIC POWER DRILLS

Andrew C. Balfour, Jr., Jamaica, N. Y.

Application June 29, 1954, Serial No. 440,018

1 Claim. (Cl. 77—7)

This invention relates to a work feeding attachment and stand for portable electric power drills.

Portable power drills are frequently used in relatively inaccessible places and in relatively awkward positions both with respect to the work and with respect to the person operating the same. Consequently, it is sometimes difficult and even impossible to apply sufficient pressure upon the drill to cause it to bite into the work.

Another problem which the owners of portable power drills sometimes encounter relates to their use as post drills or drill presses. It is frequently desirable to mount the portable drill in the manner of a drill press and to mechanically feed the work to the drill or the drill to the work without holding either the drill or the work in the hand.

The main object of this invention is the provision of a mechanical work feeding attachment for portable power drills which enables the operator to mechanically feed the work to the drill or the drill to the work while using the drill in a portable sense. This attachment includes a work supporting or engaging member, a slidably mounted rack secured to said member and a toothed lever engaging said rack. When the toothed lever is worked, the rack feeds the work supporting or engaging member in the direction of the drill bit.

An important feature of this work feeding attachment is the fact that the rack is cylindrical in shape and the toothed lever is mounted for movement around said rack as well as with it as the rack moves longitudinally, so as to provide for ready accessibility of the lever, irrespective of the position of the drill and of the person operating the drill and irrespective of whether said person happens to be a right-handed or left-handed individual.

Another important object of this invention is the provision of a stand for said work feeding attachment to support said attachment on a work bench or table or the like. The attachment, in turn, supports the drill and the work may be placed between the drill and the work-supporting member above mentioned. In such case, when the lever is actuated in respect to the rack, the drill would be advanced toward the work rather than the work toward the drill.

Still another object of this invention is the provision of an adjustable support by which the attachment herein claimed is mounted upon the drill. This adjustable support enables the drill and the attachment to be moved laterally relative to each other so as to accommodate a wider or narrower piece of work, this adjustment being wholly independent of the rack adjustment by which the attachment is adapted to work pieces of various thicknesses.

Still another object of this invention is the provision of a work supporting member which is adapted to support cylindrical pieces of work in operative position equally as readily as flat stock or the like. For example, a tube or pipe or round rod would be readily held in place by the present attachment and fed to the drill. This is accomplished by simply providing a groove or channel in the work supporting member, said groove or channel being semi-circular in cross section or of similar trough shape to accommodate a tube or pipe or the like.

A still further object of this invention is the provision of a work supporting or engaging member which supports or engages work of any complex symmetrical or asymmetrical piece of work. This work supporting or engaging member is an adjustable stud having a point which engages the work. Since a point is capable of engaging a piece of work of any possible shape, this pointed stud is capable of engaging whatever kind and shape of work is likely to be encountered.

The invention is illustrated in the accompanying drawing in which:

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a section on the line 5—5 of Fig. 1.

Fig. 6 is a side view showing the device herein claimed mounted on a bracket for use inwardly a substantial distance from the edge of the work or from the edge of the work support or from the edge of the bracket support.

Fig. 7 is a sectional view on the line 7—7 of Fig. 6.

Fig. 8 is an end view of the bracket shown in Fig. 6.

Fig. 9 is a sectional view on the line 9—9 of Fig. 6.

Figure 1:
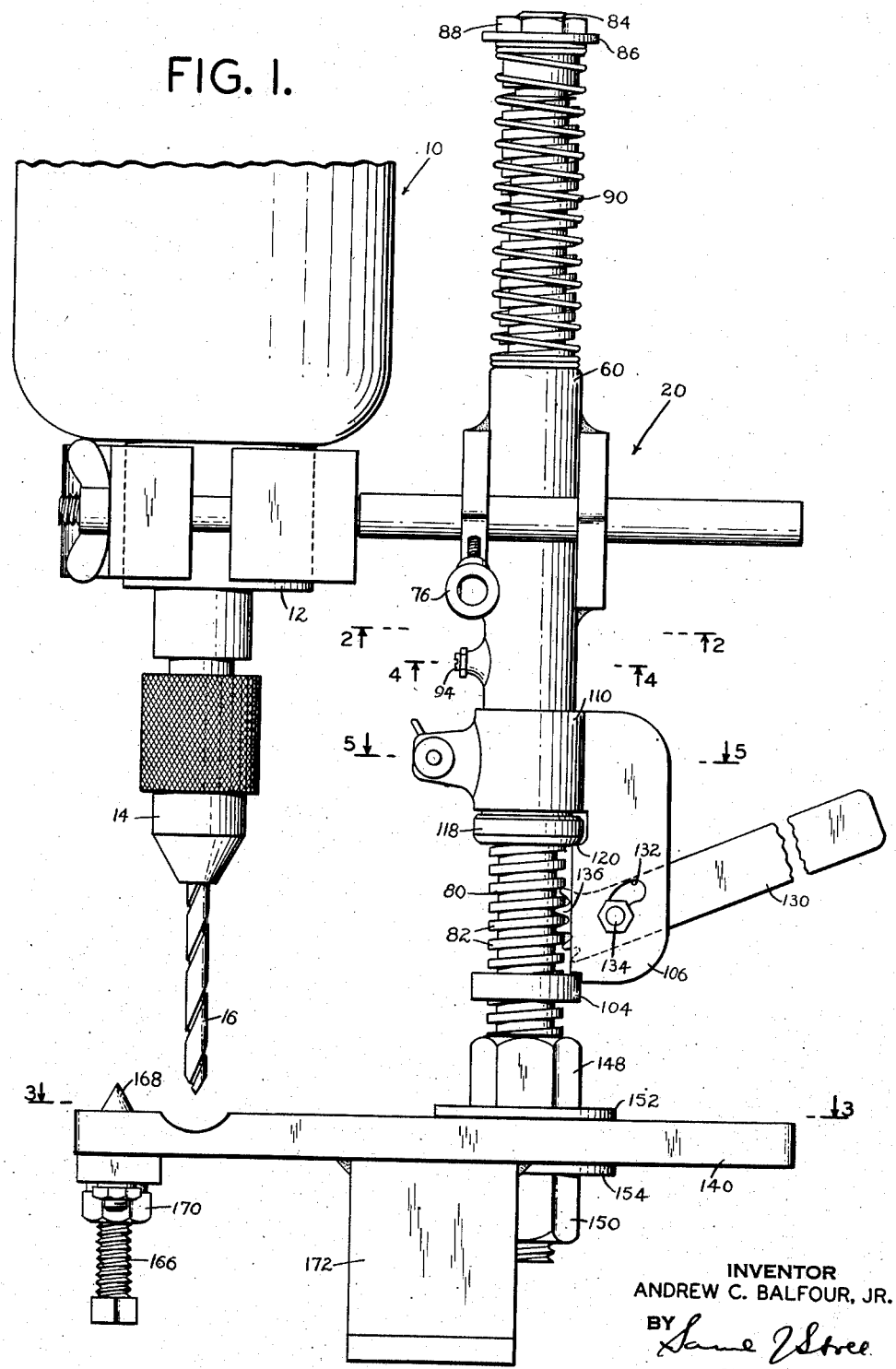
Fig. 1 is a side view of an attachment made in accordance with this invention.

Fig. 1 shows a portable power drill 10 which is intended to be of conventional construction. It has a collar portion 12, a chuck 14 and a drill bit 16 mounted in said chuck. The attachment 20 which is herein described and claimed is connected solely to the collar 12 of the drill. It will be observed in Figs. 1 and 2 that a pair of clamp members 22 and 24 are provided for clamping upon collar 12. Clamp member 22 is provided with an arcuate yoke portion 22a in which collar 12 is adapted to fit snugly. There are two end portions 22b and 22c which have parallel holes 26 and 28 formed therein to accommodate a pair of shafts 30 and 32 respectively. Clamp member 24 has a V-shaped recess 34 formed therein to accommodate collar 12 of the drill. Should the collar be smaller than the arcuate yoke 22a is intended to receive, said smaller collar will nonetheless be engaged along two parallel lines by the V-shaped portion 34 of clamp member 24 and it will also be engaged along a third line by said arcuate yoke 22a. Consequently, as will hereinafter be seen when the two clamp members 22 and 24 are clamped upon collar 12, there will be at least a three point (line) engagement therewith. It will be noted in this connection that a pair of holes 36 and 38 are formed in clamp member 24, corresponding to and registering with holes 26 and 28 in clamp member 22, and that said holes 36 and 38 accommodate shafts 30 and 32 above mentioned.

Shafts 30 and 32 are provided with screw threads 40 and 42 at one end and at their opposite end they are integral with shafts 44 and 46 of larger diameter than said shafts 30 and 32. Shoulders 48 and 50 are formed between shafts 30 and 44 and shafts 32 and 46 respectively. Clamp member 24 abuts shoulders 48 and 50. Wing nuts 52 and 54 on threaded portions 40 and 42 abut clamp member 22. Consequently, when these wing nuts are tightened upon the screw threaded shafts 30 and 32, clamp members 22 and 24 are clamped securely upon collar 12 and it is by this means that the attachment as a whole, hereinafter described, is secured to the drill.

Attachment 20 includes a tubular housing 60. Secured to said tubular housing are a pair of parallel bars 62 and 64 respectively which occupy opposite sides of the tubular housing 60. Registering holes 66 and 68 are formed in bars 62 and 64 at one end thereof to accommodate shaft 44 and corresponding holes 70 and 72 are formed in the opposite ends of bars 62 and 64 to accommodate shaft 46. These shafts 44 and 46 are slidably mounted in said holes last above mentioned and set screws 74 and 76 are provided at the opposite ends of bar 62 to engage said shafts 44 and 46 and to lock said shafts and said bar 62 against relative movement. Since bar 62 is secured to housing 60 and said housing 60 is secured to bar 64, this is the means of locking said housing and both bars in place on shafts 44 and 46.

Longitudinally movable through tubular housing 60 is a cylindrical rack 80. It is immaterial whether the teeth 82 of said rack are concentric therewith and constitute a plurality of parallel rings or whether they are all interrelated and continuous with each other to form a continuous spiral thread. The drawing shows the rack teeth in the form of a continuous spiral thread and each convolution or turning constitutes a separate tooth at any given point. The upper end of cylindrical rack 80 is reduced and threaded to form a screw-threaded end portion 84. A washer 86 and a nut 88 are mounted on said screw-threaded end portion 84 and the washer serves as a top stop member for a compression spring 90 mounted on said rack 80 above the tubular housing 60. The lower end of said spring bears against said housing and consequently its action is to urge the rack upwardly through the housing.

It is important that there be no angular movement of the rack about its own longitudinal axis relative to the housing 60. A groove 92 is accordingly formed in rack 80, longitudinally thereof, and projecting into said groove is a key 94 which is secured to the housing. Groove 92 serves as a key way for said key and rack 80 remains free to move longitudinally through the housing but it cannot turn therein. It will be noted that key 94 consists of a screw-threaded member 96 which has a reduced stud portion 98 at its inner end and that said stud portion constitutes the key proper since it engages the key way 92. A nut 100 on screw member 96 engages a boss 102 on housing 60 and clamps said screw member 96 in place.

A collar 104 is secured to rack 80 adjacent its lower end. It will be observed that this collar engages a pair of plates 106 and 108 respectively which are secured to another collar 110. Collar 110 is rotatably mounted on tubular housing 60. This collar 110 is of the split or bifurcated type and it is provided with a pair of wing portions 112 and 114 respectively. Interengaging these wing portions is a thumb screw 116. When the thumb screw is turned tight upon wings 112 and 114, collar 110 is clamped tight upon housing 60 and it cannot move relative thereto. At the lower end of housing 60 is a ring-shaped portion 118. This ring-shaped portion is engageable at its upper side with collar 110 and at its lower side with shoulders 120 formed on plates 106 and 108. Since ring-shaped portion 118 is firmly secured to or is integral with the housing 60, collar 110 and its plates 106 and 108 are locked against longitudinal movement relative to said housing 60 but they are free to turn relative thereto when screw 116 is loosened. It will therefore appear that collar 104 engages plates 106 and 108 to serve as a bottom stop member which opposes the action of spring 90. In another sense collar 104 is a gauge which limits the movement of the rack and, as will hereinafter be seen, it thereby limits the movement of the work relative to the drill or the drill relative to the work. Collar 104 is in the nature of a nut which may be turned relative to the rack so as to be positioned at any desired point thereon.

A lever or handle 130 is mounted between plates 106 and 108. Arcuate slots 132 are formed in the two plates in registration with each other and they accommodate a bolt 134 which serves as a fulcrum for lever 130. A plurality of teeth 136 are formed at the inner end of lever 130 for engagement with teeth 82 of rack 80. Interengagement between teeth 136 and 82 takes place when the handle is worked in clockwise direction as viewed in Fig. 1. In such case bolt 134 is at the lower inner end of arcuate slots 132. When the lever is brought upwardly so as to move the bolt into the upper outer ends of slots 132, teeth 136 will be brought out of engagement with teeth 82 and the rack will be free from the control of handle 130. It will be apparent that when the handle is pulled or pushed downwardly in clockwise direction as viewed in Fig. 1 the rack will be forced to move upwardly through housing 60.

At the lower end of the rack, below gauge collar 104, is a work supporting plate 140. This plate is bifurcated and it consists of a pair of parallel legs 142 and 144 respectively joined at one end by means of a yoke 146. This bifurcated support 140 straddles the lower end of rack 80 and it is adjustably secured thereto by means of a pair of upper and lower nuts 148 and 150 respectively on said rack. Washers 152 and 154 are disposed between said nuts and said support 140. The work is placed between support 140 and the drill bit 16. When lever 130 is actuated to move rack 80 upwardly through housing 60, this will cause support 140 to move or advance the work toward the drill bit or, conversely, the drill bit will be advanced toward the work.

Arcuate grooves or recesses 156 and 158 are formed, respectively, in legs 142 and 144 of the bifurcated support 140. These grooves will receive a round or cylindrical piece of work and hold it in operative position relative to the drill bit. Across the free ends of legs 142 and 144 is a bar 160 which is secured thereto by means of bolts 162 and 164 respectively. A screw-threaded member 166 projects through bar 160 and its upper reduced end 168 is adapted to engage an asymmetrical piece of work to hold it in operative position relative to the drill. A nut 170 on screw member 166 clamps it in place against bar 160.

Should it be desired to operate the drill as a post drill or drill press, a stand 172 is secured to the bottom of bifurcated support 140. Flanges 174 and 176 are secured to said stand 172 and they are provided with holes 178 for screws, bolts or other fastening members to fasten said stand to a suitable support such as a work bench or table.

In place of bifurcated support 140 shown in Fig. 1, a bifurcated bracket or clamp 180 shown in Fig. 6 is provided to add versatility to the tool herein claimed. It will be understood that there are times when it is desired to apply a portable drill to a point which is removed a substantial distance from the edge of the work or work support or from the edge of the drill support as herein claimed. For example, there are times when it is found necessary to drill holes at or near the center of a large disc, say two or three feet in diameter or a large rectangle which is two or three feet wide at its narrower dimension. In such case, bracket 180 would be very useful in supporting the portable drill herein described so that it may be applied to the work with adequate force or pressure. Bracket 180 is a C-shaped member whose upper arm 182 is bifurcated as Fig. 9 clearly shows. The solid or non-bifurcated end of arm 182 is designated in Fig. 9 with the reference character 182a. The lower arm 184 is provided with a web portion 184a opposite the solid portion 182a of the upper arm but said lower arm projects beyond said solid portion 182a as Fig. 9 clearly shows.

It will be noted in Fig. 7 that web 182a is provided with downwardly extending flanges 182b and 182c. Similarly, web 184a is provided with upwardly extending flanges 184b and 184c and it will be understood that these several flanges extend the full length of the arms 182 and 184 with which they are respectively integral. These flanges are designed to provide the arms with adequate structural strength. Secured to arms 182 and 184 is a vertically extending structural member 186 which is provided with a pair of side flanges 186a and 186b respectively. Flange 186a is secured to flanges 182b and 184b above mentioned and flange 186b is secured to flanges 182c and 184c above mentioned. The web portion 186d of structural member 186 is secured to the web portions 182a and 184a above mentioned as well as to flanges 182b, 182c, 184b and 184c. Registering slots may be formed in webs 182a, 184a and 186d to accommodate a generally C-shaped reinforcing member 188 but these slots may be dispensed with and the C-shaped member 188 may be adapted to receive said webs 182a, 184a and 186d without being notched thereto. In either case, welds 204 are provided to weld said C-shaped reinforcing member 188 to the three webs last mentioned. By the same token, all of the connected flanges above mentioned may be connected by means of welding or other suitable fastening means. The ultimate result of combining all of these elements is the provision of a generally J-shaped structural element whose longer arm is disposed above its shorter arm, both arms extending parallel to each other on horizontal planes as viewed in Fig. 6.

It has been stated that the upper arm 182 is bifurcated and it will now be understood that it is adapted to receive in its slot 190 the screw 80 of the drill attachment above described. Washers 152 and 154 on said screw receive flanges 181 between them, said flanges being extensions of web 182a. Nuts 148 and 150 clamp said washers to said flanges 181 and thereby support the screw member 80 on the upper arm 182 of the J-shaped member. These nuts may be loosened to shift screw 80 to any position along slot 190 that may be selected.

A screw 192 projects through web 184a in screw-threaded engagement therewith. A tapped boss 202 may be secured to web 184a to receive said screw 192 and to give it added support. At the upper end of the screw as viewed in Fig. 6 is a swivel-type button 194. At the lower end is a sleeve 196 through which a rod 198 slidably extends. A pair of balls or buttons 200 are secured to the ends of rod 198 to prevent it from slipping out of sleeve 196.

Screw 192 is, of course, a clamp screw whose button 194 engages the lower surface of a suitable support such as a table top. Arm 182 engages the upper surface of said table top or other suitable support. Consequently, the J-shaped support may securely but removably be fastened to a table top or other supporting member. By this means screw 80 of the attachment herein claimed and the entire drill mechanism may be supported on the J-shaped supporting member and on the support therefor, such as a table top or any other suitable support. The support to which the J-shaped member is attached may also be a work support or it may simply be the work itself.

The foregoing illustrates preferred aspects and embodiments of this invention and it will be understood that modifications and variations thereof may be had within the broad spirit of the invention and the broad scope of the claim.

I claim:

An attachment for a portable power drill, comprising a housing adapted to be secured to said drill, a cylindrical rack having a continuous spiral thread winding around it, said rack being supported by said housing and being longitudinally movable therein, a collar swivelly mounted on said housing coaxially with said rack and being swivelly movable angularly of said rack, clamp means on said collar adapted to clamp it in selected angular positions relative to said housing and said rack, a toothed lever pivotally supported on said collar for engagement with said spiral thread of the rack to move the rack longitudinally in either direction relative to the housing, said toothed lever being also slidably supported on said collar so as to be movable into and out of engagement with said spiral thread on the rack, and a work engaging member adjustably secured to said rack, said work engaging member comprising a generally J-shaped clamp having a relatively long, upper, bifurcated arm to which the rack is secured in perpendicular relation thereto, and a relatively short lower arm situated in generally parallel relation to said relatively long upper arm, said lower arm being provided with a clamp screw projecting therethrough and said upper arm and said clamp screw being adapted to engage a suitable support between them.

References Cited in the file of this patent

UNITED STATES PATENTS

| | | |
|---|---|---|
| 591,135 | Kerry | Oct. 5, 1897 |
| 949,965 | Shek | Feb. 22, 1910 |
| 1,169,657 | Leopold | Jan. 25, 1916 |
| 1,522,124 | Hoisington | Jan. 6, 1925 |
| 1,852,736 | Connell | Apr. 5, 1932 |
| 2,633,165 | Palkowski | Mar. 31, 1953 |
| 2,642,761 | Goldberg | June 23, 1953 |

FOREIGN PATENTS

| | | |
|---|---|---|
| 399,400 | France | June 28, 1909 |